United States Patent [19]
Takaba

[11] Patent Number: 5,696,676
[45] Date of Patent: Dec. 9, 1997

[54] SELF-DIAGNOSIS APPARATUS FOR VEHICLES

[75] Inventor: Katsumi Takaba, Obu, Japan

[73] Assignee: Nippondenso Co., Ltd., Aichi-pref., Japan

[21] Appl. No.: 605,626

[22] Filed: Feb. 22, 1996

Related U.S. Application Data

[63] Continuation of Ser. No. 197,596, Feb. 17, 1994, abandoned.

[30] Foreign Application Priority Data

Feb. 18, 1993 [JP] Japan .................... 5-053099
Dec. 24, 1993 [JP] Japan .................... 5-348139

[51] Int. Cl.$^6$ .................... G06F 7/70; G06G 7/76
[52] U.S. Cl. .................... 364/424.036; 364/424.034; 364/424.04; 364/431.04; 364/424.039; 73/117.3; 73/118.1; 123/416; 123/417; 340/438; 340/439
[58] Field of Search .................... 364/424.03, 424.04, 364/424.05, 424.01, 431.01, 431.04, 431.1, 431.11, 431.12, 550, 551.01, 424.034, 424.039, 424.038, 424.036, 424.035; 395/905, 911; 73/116, 117.2, 117.3, 118.1, 119 A; 340/438, 439, 459, 520, 518, 529, 870.03, 825.1, 825.16; 123/479, 416, 417, 415, 339.1, 361, 198 D, 571, 520; 371/25.1, 20.1, 67.1, 68.1

[56] References Cited

U.S. PATENT DOCUMENTS

| | | | |
|---|---|---|---|
| 4,437,342 | 3/1984 | Hosaka et al. | 73/119 A |
| 4,497,057 | 1/1985 | Kato et al. | 364/431.04 |
| 4,618,954 | 10/1986 | Otobe et al. | 371/16.5 |
| 4,715,348 | 12/1987 | Kobayashi et al. | 364/431.06 |
| 4,843,557 | 6/1989 | Ina et al. | 364/431.11 |
| 4,882,669 | 11/1989 | Miura et al. | 364/184 |
| 4,896,276 | 1/1990 | Saglimbeni et al. | 364/551.01 |
| 4,975,846 | 12/1990 | Abe et al. | 364/424.03 |
| 4,996,657 | 2/1991 | Shiraishi et al. | 364/424.05 |
| 5,005,129 | 4/1991 | Abe et al. | 364/431.01 |
| 5,029,466 | 7/1991 | Nishihara et al. | 73/118.1 |
| 5,107,427 | 4/1992 | Peter et al. | 364/424.03 |
| 5,276,619 | 1/1994 | Ohara et al. | 364/424.04 |
| 5,388,045 | 2/1995 | Kamiya et al. | 364/424.04 |
| 5,414,645 | 5/1995 | Hirano | 364/424.03 |
| 5,491,631 | 2/1996 | Shirane et al. | 364/424.04 |

FOREIGN PATENT DOCUMENTS

| | | |
|---|---|---|
| 61-292709 | 12/1986 | Japan . |
| 62-142849 | 6/1987 | Japan . |
| 63-90738 | 4/1988 | Japan . |
| 63-159623 | 7/1988 | Japan . |
| 4-93740 | 8/1992 | Japan . |

*Primary Examiner*—Jacques Louis-Jacques
*Attorney, Agent, or Firm*—Cushman, Darby & Cushman IP Group of Pillsbury Madison & Sutro LLP

[57] ABSTRACT

A control unit of a self-diagnosis apparatus for a vehicle includes a CPU and a non-volatile RAM, wherein the CPU has a function of detecting abnormalities occurring in vehicle-mounted devices and of inputting diagnostic data for the vehicle-mounted devices necessary for the analysis of detected abnormalities. In the case of an abnormality occurring in a particular vehicle-mounted device during two consecutive trips, the abnormality is judged to be a final abnormality, whereas an abnormality of the particular vehicle-mounted device detected during the first trip was judged to be only a temporary abnormality. Moreover, updating of the diagnostic data is inhibited for a second abnormality as is subsequent final storage of the diagnostic data for an abnormality occurring in the second vehicle-mounted devices. If a further abnormality of the first vehicle-mounted device is detected again during a second trip, it is judged to be a final abnormality and thus an abnormality code is set in RAM and the diagnostic data is frozen by inhibiting any update of the diagnostic data. If the abnormality of the first vehicle-mounted device is not detected during the second trip, the temporary abnormality is cancelled. Thereby, the present invention makes it possible to more accurate and pertinent store diagnostic data for the analysis of abnormalities in vehicle-mounted devices.

18 Claims, 11 Drawing Sheets

FIG. 7

FRAME 1

| | |
|---|---|
| 10 | ABNORMALITY CODE |
| 11 | ENGINE SPEED |
| 12 | ENGINE WATER TEMPERATURE |
| 13 | THROTTLE OPENING |
| 14 | ENGINE SPEED CHANGE RATE |
| 15 | NO. OF IGNITION TIMES DURING TRIP |
| 16 | NO. OF MISFIRE TIMES DURING TRIP |
| 17 | AIR-FUEL RATIO LEARNING VALUE |

1

SELF-DIAGNOSIS APPARATUS FOR VEHICLES

This is a continuation of application No. 08/197,596, filed on Feb. 17, 1994, which was abandoned upon the filing hereof.

BACKGROUND OF THE INVENTION

The present invention relates to a self diagnostic apparatus for vehicles which stores more accurate diagnostic data necessary for the analysis of abnormalities occurring in devices mounted on a vehicle.

Vehicles of today have been electronically controlled to a great extent, so that an engine and other vehicle-mounted devices are cooperatively interconnected with each other by a control computer to perform complicated operations.

Even if a single vehicle-mounted device becomes defective, the true source of the problem cannot be traced in many cases because of complicated mutual relations involved between the single vehicle-mounted device and the other vehicle-mounted devices. To overcome this problem, extensive data (diagnostic data) representing an operating condition of the vehicle at the time of occurrence of the operation abnormality should be collected. Furthermore, an operation abnormality sometimes stops spontaneously after it has occurred temporarily. This temporary occurrence of an operation abnormality may often provide a prediction of an occurrence of a real failure. However, it is difficult to detect the cause by inspecting various vehicle-mounted devices after the vehicle has come to a standstill.

A technique is disclosed in JP-A-63-159623 in which diagnostic data during a predetermined time period before and after the occurrence of an engine trouble is stored. Another technique is disclosed in JP-A-61292709 in which, when a symptom of any system abnormality is detected, updating of diagnostic data is temporarily inhibited, and, if the system abnormality does not actually occur thereafter, then the diagnostic data is updated.

The occurrence of one abnormality often causes other abnormalities stemming from the first abnormality. For example, an engine misfire may give rise to another abnormality in a fuel supply system (air fuel ratio adjustment system). In this exemplary case, since a misfire by nature is of a relatively low degree of emergency, it is often detected only twice (only one detection during any one trip) before the occurrence of the misfire is finally confirmed as a final abnormality. Since the occurrence of a fuel supply system abnormality is detected only once preferentially and then confirmed as a final abnormality, the diagnostic data related to the fuel supply system abnormality obtained at this time are stored. Thus, a problem arises in that a true cause of the fuel supply system abnormality cannot be traced. The term "trip" as used here means an operation time period from the time when an ignition switch is turned on to the time when it is turned off.

SUMMARY OF THE INVENTION

The present invention intends to solve the above-mentioned problem and aims to provide a self-diagnostic apparatus for vehicles capable of storing more accurate diagnostic data for an operation abnormality which occurrence is confirmed only when the operation abnormality occurs during a plurality of trips.

The featured structure of the self-diagnosis apparatus for vehicles of the present invention will be described with reference to FIG. 11. The apparatus of the present invention includes abnormality detecting means for detecting the occurrence of an abnormality in vehicle-mounted devices, diagnostic data detecting means for detecting diagnostic data necessary for the analysis of the abnormality, abnormality judging means for judging one type of abnormality detected once (i.e., during one trip) and thus to be a temporary or tentative abnormality. One trip is to be interpreted as an operation time period from the time when an ignition switch is turned on to the time when the ignition switch is turned off. The abnormality judging means also judges the temporary abnormality to be a final abnormality when the same type of abnormality is detected again during a predetermined number of trips after the temporary abnormality has once been judged. The abnormality judging means cancels the judged temporary abnormality when the same type of abnormality is not detected again during a certain number of trips temporary the abnormality has once been made judged. Diagnostic data storage means temporarily stores diagnostic data obtained when the temporary abnormality is judged and finally stores the temporarily stored diagnostic data when the temporary abnormality is judged to be a final temporary abnormality. Abnormality type storage means stores the type of abnormality of the final abnormality. Diagnostic data storage inhibiting means inhibits after a temporary abnormality of one of the vehicle-mounted devices has been established, fuel storage of the diagnostic data related to an abnormality occurring in another one of the vehicle-mounted devices.

The predetermined number of trips include preferably one trip immediately after the initial trip during which a first type of abnormality has been detected for the first time.

The apparatus of the present invention further includes temporary abnormality storage means for storing a temporary abnormality code for an abnormality when it is detected during a trip, whereby the abnormality judging means judges the detection of the occurrence of an abnormality during the predetermined number of trips in accordance with the temporary abnormality code stored in the temporary abnormality storage means.

In accordance with the self-diagnosis apparatus for vehicles of the present invention constructed as above, when an abnormality of a first vehicle-mounted device is detected during one trip, this abnormality is first judged to be a temporary abnormality, and, even if a second abnormality occurring in another vehicle-mounted device is detected thereafter, final storage of diagnostic data related to the second abnormality occurring in the second vehicle-mounted device is inhibited. However, diagnostic data for the first abnormality detected during the first trip is temporarily stored. Accordingly, even if another abnormality should stem from the first abnormality which occurred during the first trip, diagnostic data for the latter abnormality is prevented from being erroneously stored.

If an abnormality of the same first type is detected again during the predetermined number of trips, the first abnormality is judged to be a final abnormality, and the diagnostic data stored temporarily at the time of judgement of the temporary status of the first abnormality as well as the type of abnormality are deemed final and are finally stored for use in later analysis of the root cause of the problems occurring in the vehicle.

If a further abnormality of the same type is not detected during any of the predetermined number of trips after the judgement of a temporary abnormality has once been made, the temporary abnormality is cancelled, thereby allowing the detection of the occurrence of an abnormality of the second type of abnormality to be made and stored as diagnosis data.

BRIEF DESCRIPTION OF THE DRAWINGS

FIG. 7 shows an example of a diagnostic data storage area of the standby RAM.

DESCRIPTION OF THE PREFERRED EMBODIMENT

Embodiments of the present invention will be described with reference to the accompanying drawings.

Firstly, a self-diagnosis apparatus for vehicles of the first embodiment of the present invention will be described.

Figure 1:
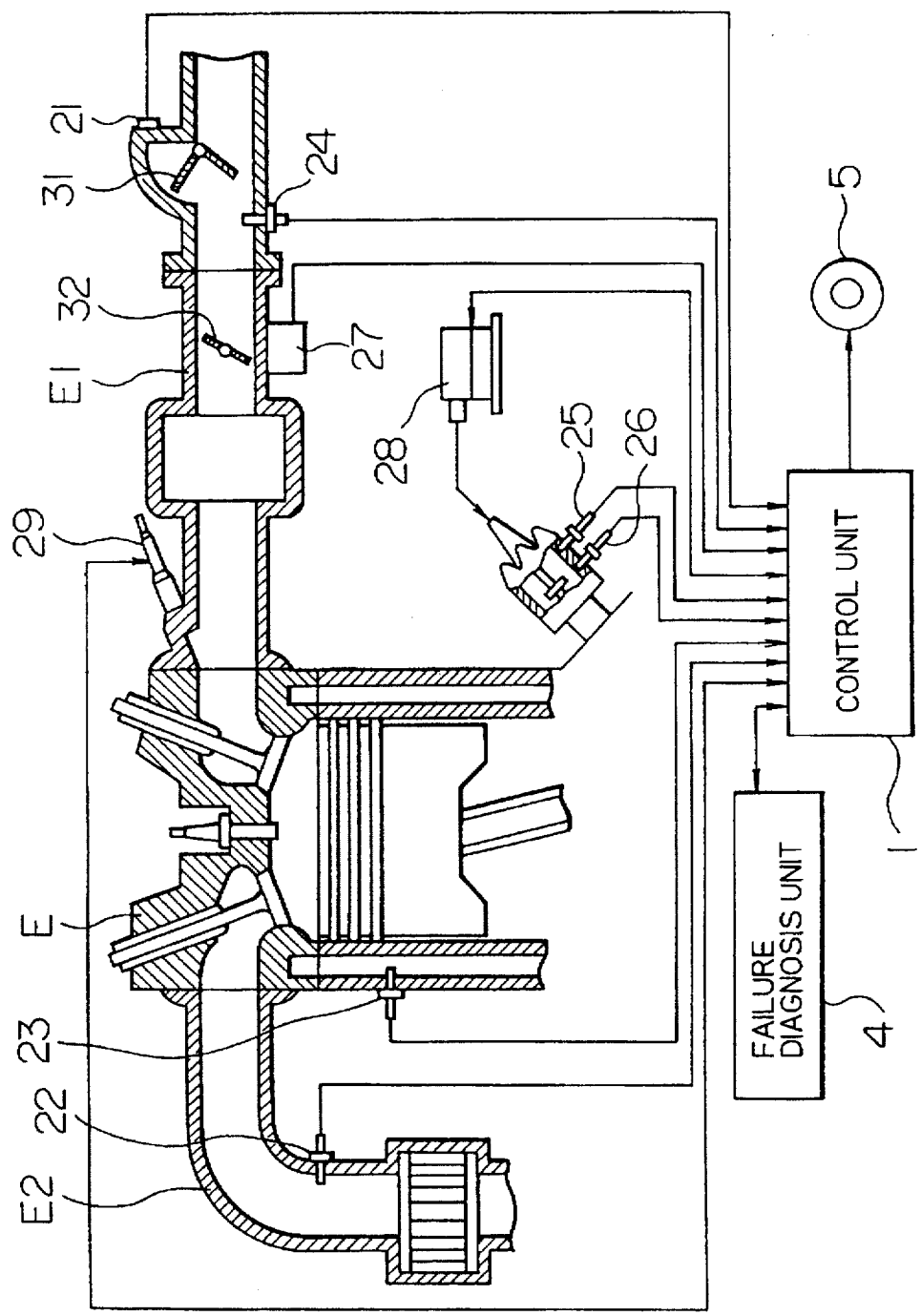
FIG. 1 is a structural drawing showing the overall structure of a self-diagnosis apparatus for vehicles according to a first embodiment of the present invention.

Referring to FIG. 1, an intake pipe E1 of an engine E is provided with a potentiometer 21 of flow meter 31, an intake air temperature sensor 24, a throttle sensor 27 for a throttle valve 32, and a fuel injection valve 29, arranged in this order from the upstream side. A water jacket of the engine E is provided with a water temperature sensor 23, and an exhaust pipe E2 of the engine E is provided with an $O_2$ sensor 22.

Figure 2:
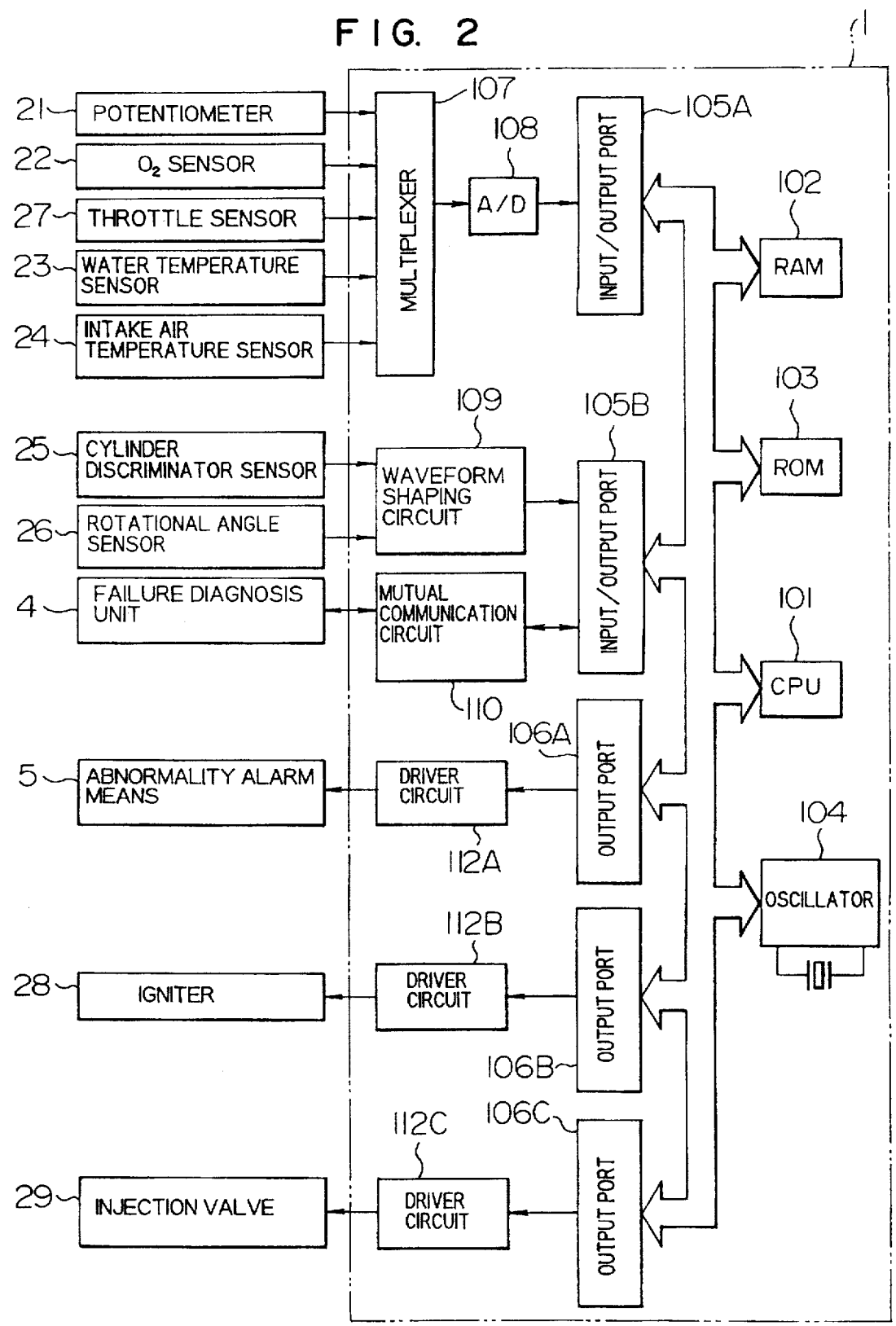
FIG. 2 is a structural drawing showing the structure of the control unit 1.

Referring to FIG. 2, a control unit 1 including a CPU 101 therein is shown. The CPU 101 is connected through a data bus to a RAM 102, a control program storage ROM 103, an oscillator circuit 104, input/output ports 105A and 105B, and output ports 106A, 106B, and 106C. The RAM 102 includes a general temporary storage RAM section and a standby RAM section which keeps its storage content even after an ignition key has been turned off.

Output signals from the potentiometer 21, $O_2$ sensor 22, water temperature sensor 23, intake air temperature sensor 24, and throttle sensor 27 are supplied through a multiplexer 107 and an A/D converter 108 to the input/output port 105A. Output signals from a cylinder discriminator sensor 25 and a rotational angle sensor 26 are supplied through a waveform shaping circuit 109 to the input/output port 105B.

Drive signals are supplied to an igniter 28 and the fuel injection valve 29 from the output ports 106B and 106C through driver circuits 112B and 112C, respectively.

When an abnormal state of each of the above described vehicle-mounted devices is detected by the procedure described later, an alarm signal is supplied to an abnormality alarm means 5 from the output port 106A through a driver circuit 112A. As will be described later, diagnostic data necessary for the analysis of abnormalities of the vehicle-mounted devices are transferred between the input/output port 105B and a failure diagnosis unit 4 through a mutual communication circuit 110.

Figure 3:
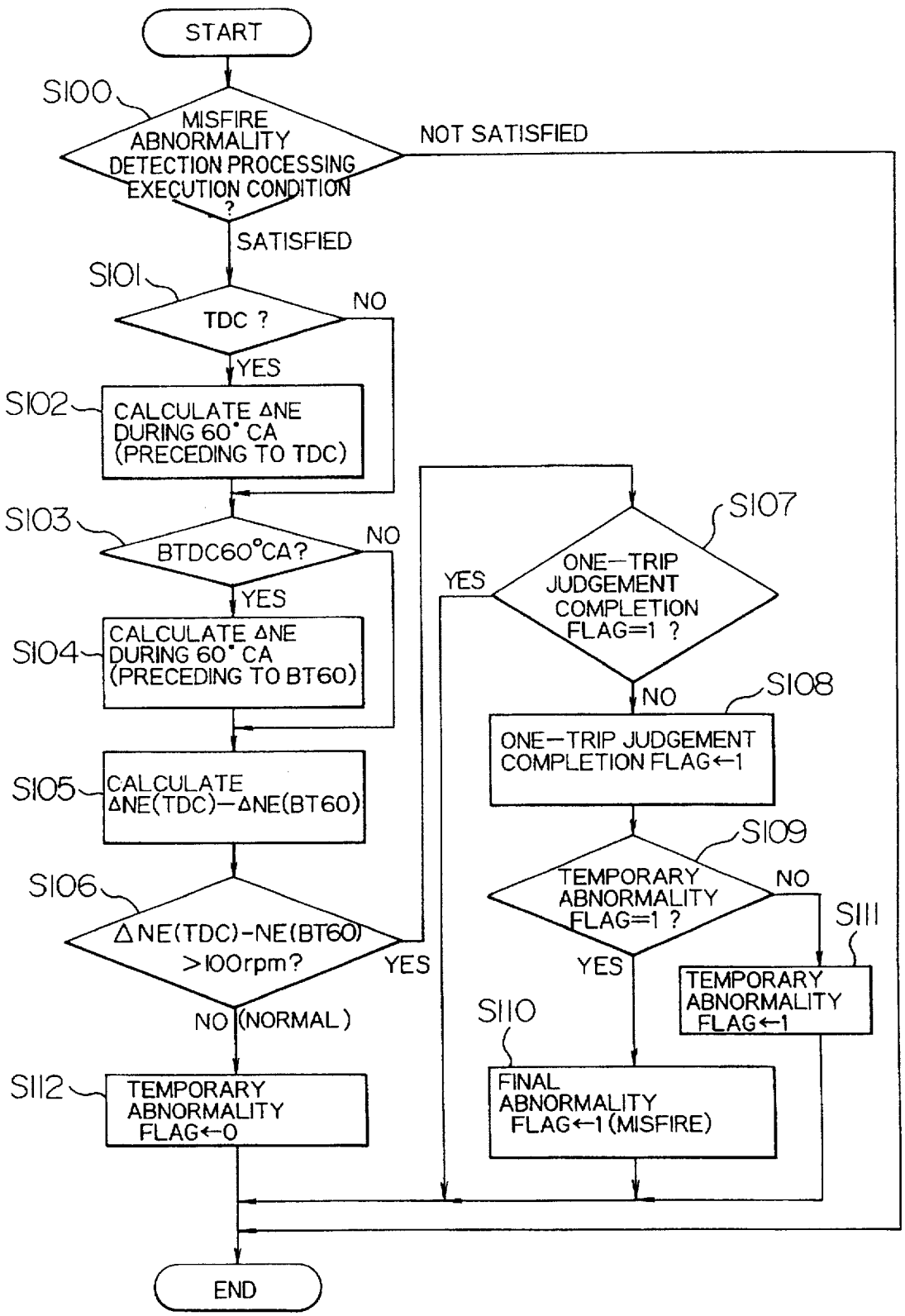
FIG. 3 is a flow chart illustrating a misfire abnormality detection program.

FIG. 3 is a flow chart illustrating a misfire abnormality detection program. This program starts at every 30° CA (crank angle). At Step S100 it is checked whether a misfire abnormality detection process execution condition is satisfied. If satisfied, the process advances to Step S101, while, if not, the abnormality detection is not executed. The abnormality detection process execution condition is satisfied under the condition that the throttle has not been driven ($|\Delta TA|<5°$), when the engine speed is equal to or higher than a stable engine speed of 600 rpm and when the water temperature is equal to or higher than 50° C. At Step S101, the position of the piston of the engine is checked to determine if it is at TDC (top dead center). When the piston position at TDC has been confirmed at Step S101, an engine speed change amount ANE (TDC) during 60° CA preceding to TDC is calculated at Step S102. Then, it is checked at Step S103 whether the piston position is at BTDC (before top dead center) 60° CA, and when this piston position has been confirmed at Step S103, an engine speed change amount ANE (BT60) during 60° CA preceding to BTDC 60° CA is calculated at Step S104.

At Step S105, a difference between the engine speed change amounts ANE (TDC) and ANE (BT60) is calculated. It is checked at Step S106 whether the difference is greater than 100 rpm. If it holds, then it is judged that a misfire abnormality has occurred, and the process advances to Step S107 and those that follow. It is checked at Step S107 whether a one-trip judgement completion flag in the general RAM has been set. If not, this flag is set at Step S108.

Next, at Steps S109 and S110, it is checked whether a temporary abnormality flag in the standby RAM has been set, and if set, a final misfire abnormality flag in the general RAM is set. If the temporary abnormality flag in the standby RAM has not been set at Step S109, this flag is set at Step S11. If it is decided by the check at Step S106 that the difference between ANE (TDC) and ANE (BT60) is 100 rpm or lower, the temporary abnormality flag is reset at Step S112.

To summarize the processes executed at the Steps S106 to S112, when an abnormality of a misfire is detected during a first trip, a temporary abnormality flag is set. Then, when the misfire is detected again during a subsequent trip, then a final abnormality flag is set. On the other hand, if the misfire is not detected during a subsequent trip, the temporary abnormality flag is reset.

Figure 4:
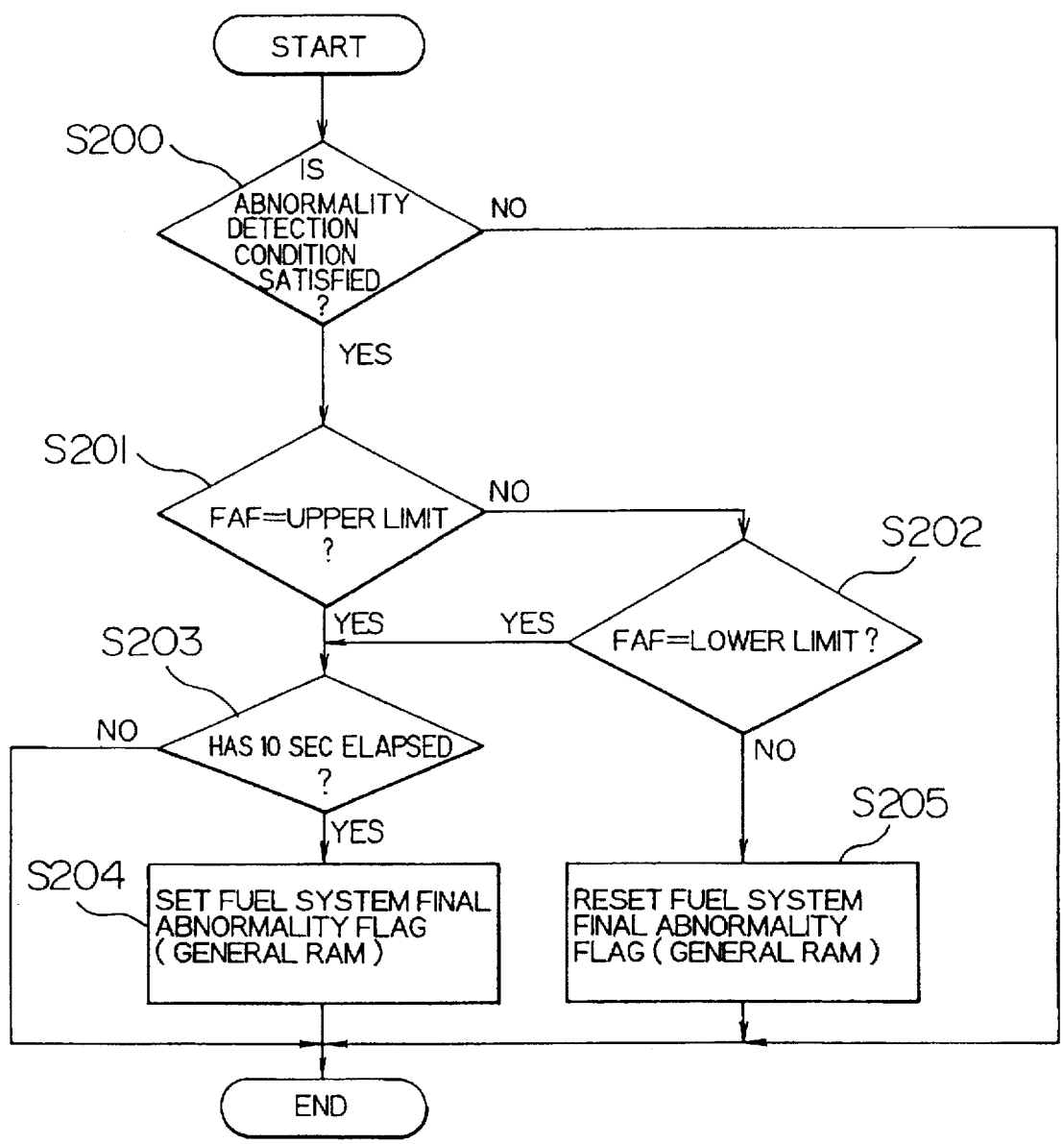
FIG. 4 is a flow chart illustrating a fuel supply system abnormality detection program starting at every 65 ms.

FIG. 4 is a flow chart illustrating a fuel supply system abnormality detection program. This abnormality occurs in an air-fuel ratio control system which performs air-fuel ratio feedback control in accordance with an output of the $O_2$ sensor. This program restarts at every 65 ms. If a fuel supply system abnormality detection condition is not satisfied at Step S200, subsequent processes are not executed. If satisfied, it is checked at Steps S201 and S202 whether an air-fuel ratio correction factor FAF has a value equal to or greater than an upper limit or a value equal to or smaller than a lower limit. The air-fuel ratio correction factor FAF is a value obtained by integrating and skipping the output of the $O_2$ sensor so as to control the air-fuel ratio at a predetermined value. If any one of the results of the checks made at Steps S201 and S202 is YES, it is checked at step S203 whether FAF continues for 10 sec or longer to have a value equal to or greater than the upper limit or a value equal to or smaller than the lower limit. If this condition is satisfied, it is judged that an abnormality in the fuel supply system has occurred, and a fuel supply system final abnormality flag in the general RAM is set at Step S204. If both of the results of the checks made at Steps S201 and S202 are NO, the fuel supply system final abnormality flag in the general RAM is reset.

Figure 5:
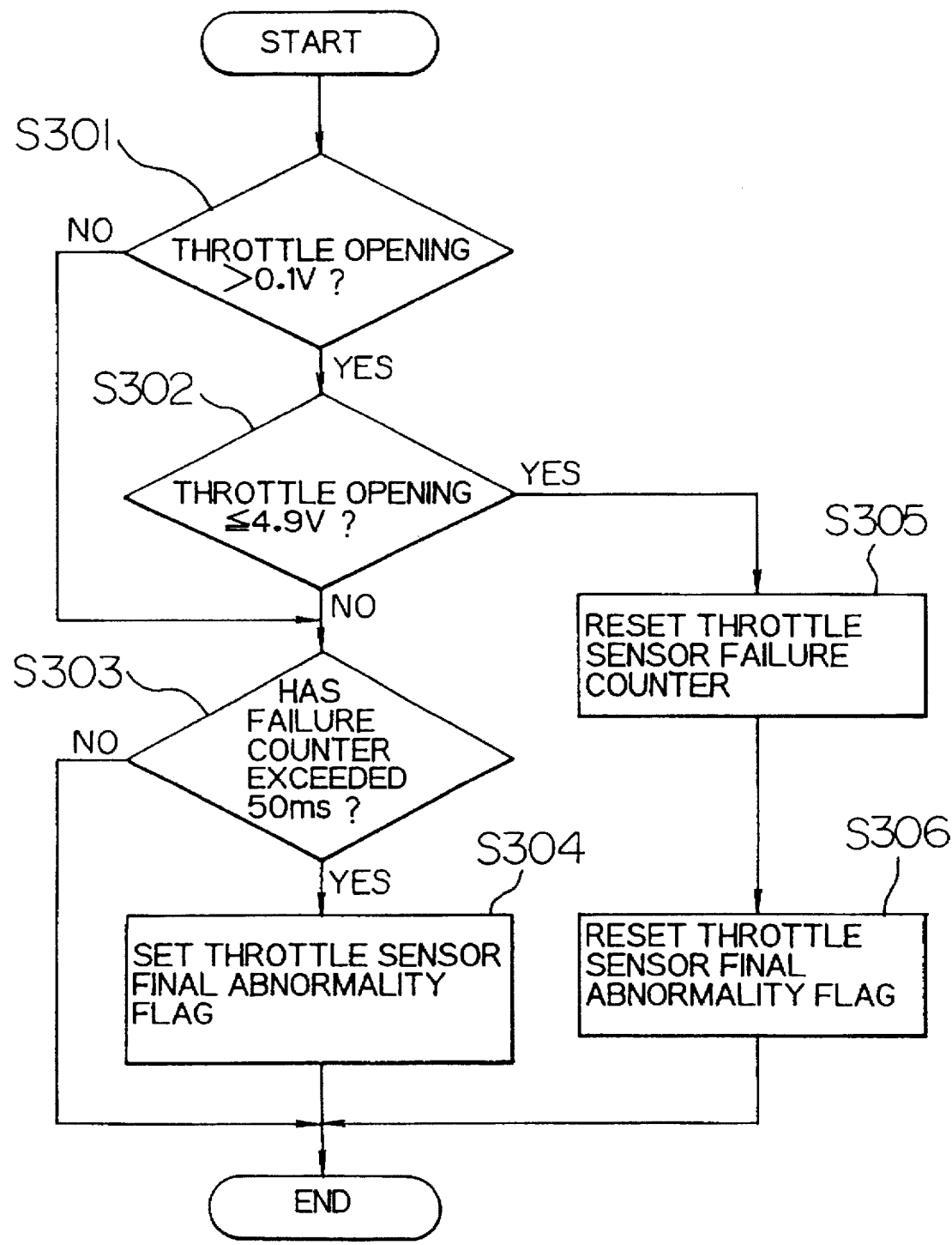
FIG. 5 is a flow chart illustrating a throttle sensor abnormality detection program.

FIG. 5 is a flow chart illustrating a throttle sensor abnormality detection program. It is checked at Steps S301 and S302 whether a throttle opening signal has a value in the range from 0.1 V to 4.9 V. If the result of this check is YES, a throttle sensor failure counter is cleared at Step S305, and a throttle sensor final abnormality flag in the general RAM is reset at Step S306. It is checked at Step S303 whether the throttle opening signal has a value outside the above-mentioned range for more than 500 ms. When it exceeds 500 ms, it is judged that an abnormality in the throttle sensor has occurred, and a throttle sensor final abnormality flag in the general RAM is set at Step S304.

Different from the detection of a misfire as soon as an abnormality in the fuel supply system or an abnormality in the throttle sensor is detected during any one trip, a final abnormality flag is set at once without setting a temporary abnormality flag.

Figure 6:
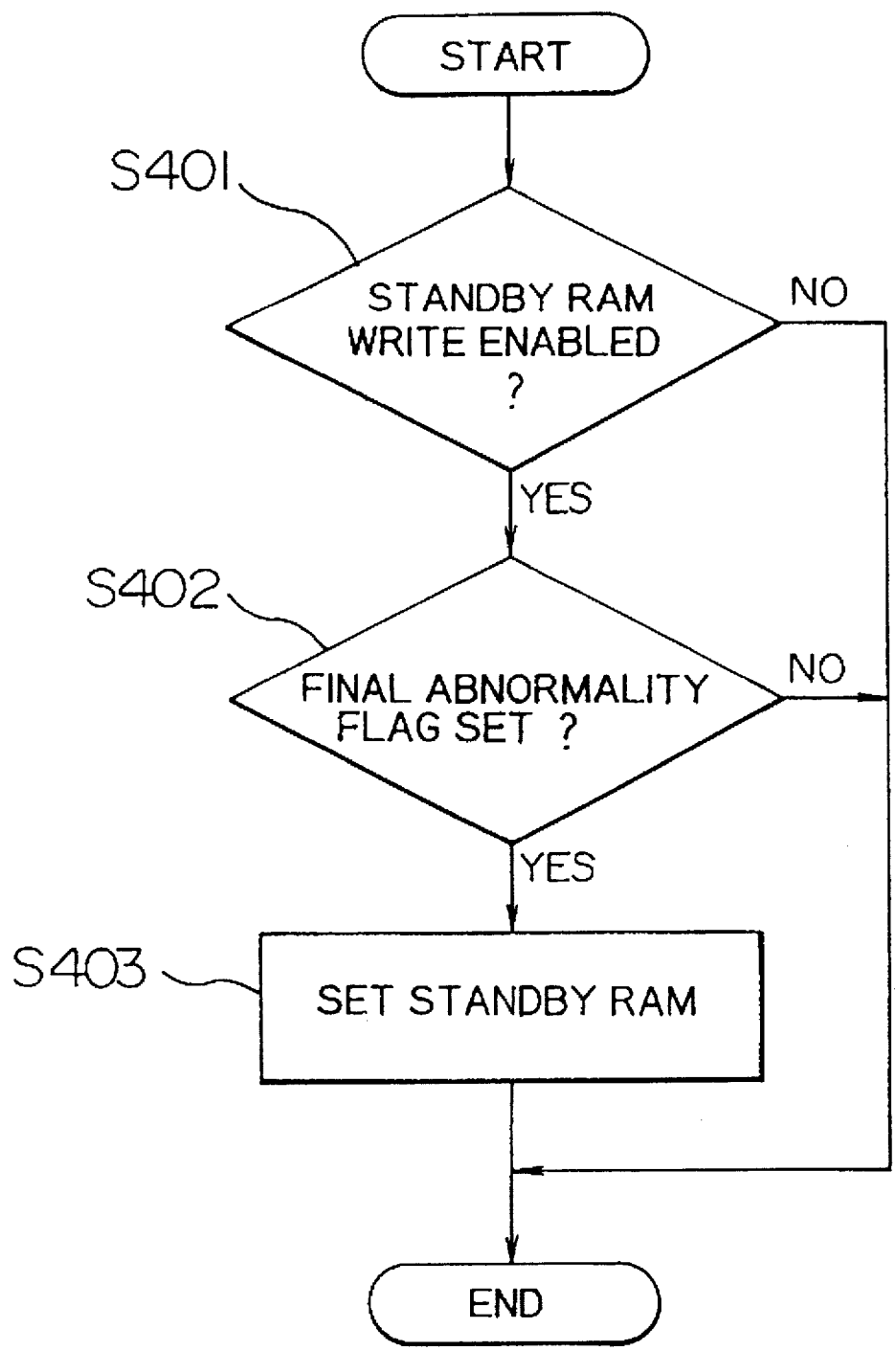
FIG. 6 is a flow chart illustrating a standby RAM setting program starting at every 65 ms.

FIG. 6 is a flow chart illustrating a program for setting a final abnormality flag in the standby RAM when each of the above-mentioned final abnormality flags have been set. This program is restarted at every 65 ms. It is checked at Step S401 whether the standby RAM is write enabled. Then, it is checked at Step S402 whether a final abnormality flag has already been set. If already set, a predetermined bit in the standby RAM is set at Step S403 to store information that an abnormality occurring in a particular device has been detected.

FIG. 7 shows an example of a diagnostic data storage area of the standby RAM. In a frame starting from address 10, an abnormal code representing the type of abnormality is set in the start address in the manner described later. In the memory area of address 11 various diagnostic data necessary for the analysis of abnormalities are stored.

Figure 8:
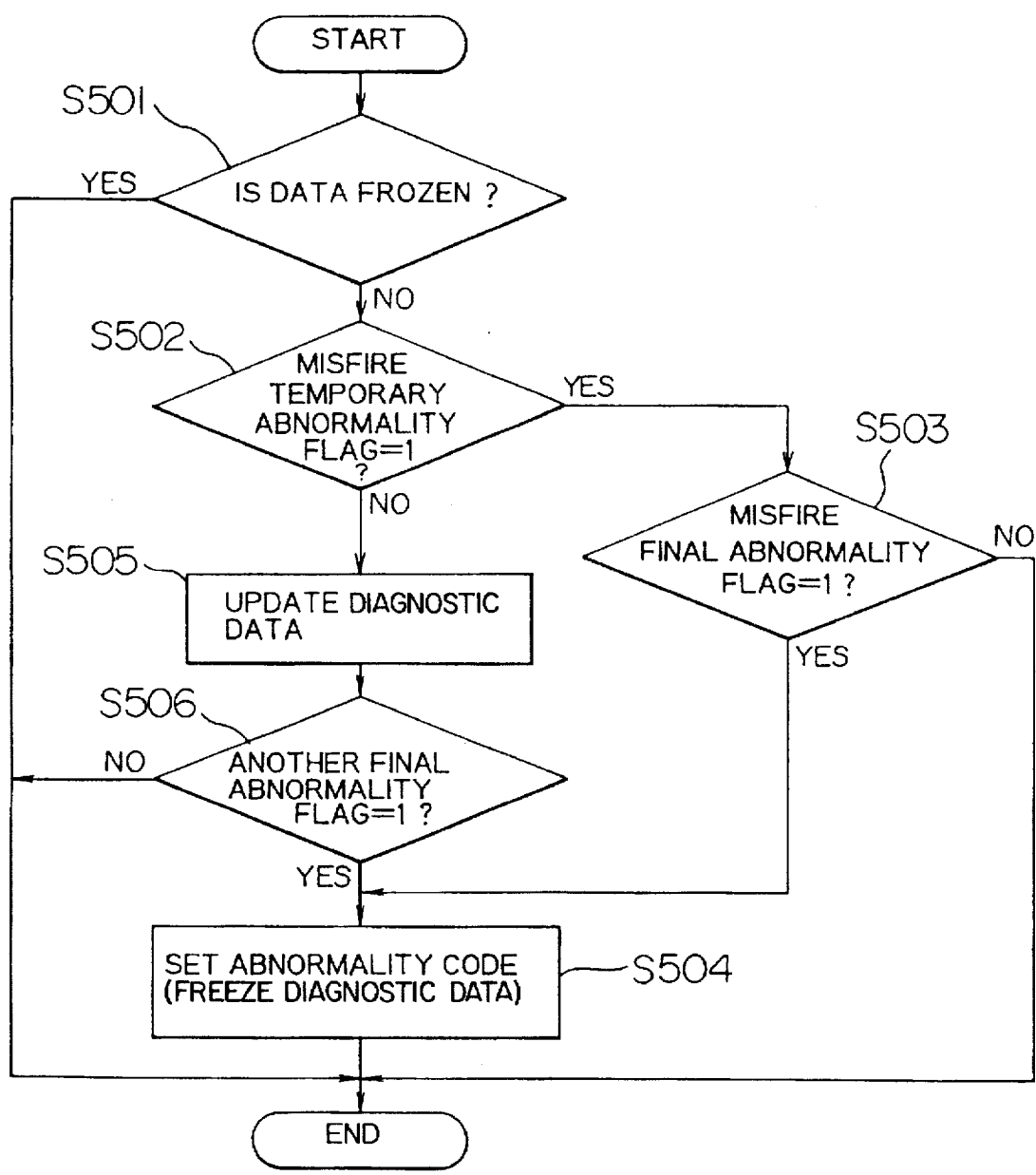
FIG. 8 is a flow chart illustrating a program for controlling writing of diagnostic data in the standby RAM.

FIG. 8 is a flow chart illustrating a program for controlling the writing of diagnostic data in the standby RAM. This program is restarted every 65 ms. It is checked at Step S501 whether any abnormal code has been set in the frame of the standby RAM and whether diagnostic data have been frozen (updating of data has been inhibited). If no abnormal code has been set, it is checked at Step S502 whether the misfire temporary abnormality flag has been set. If it has been set, it is checked at Step S503 whether the misfire final abnormality flag has been set. If it has been set, a misfire abnormal code is set in the frame and the diagnostic data are frozen at Step S504.

If it is decided at Step S502 that the misfire temporary abnormality flag has not been set, the diagnostic data are updated at Step S505. Then, it is checked at Step S506 whether any other final abnormality flag has been set. If any other final abnormality flag has already been set, an abnormality code is immediately set and the diagnostic data are frozen at Step S504.

With the above-mentioned process steps, if a misfire is detected and a misfire temporary abnormality is judged, the diagnostic data are not updated, nor is the setting of any other final abnormality flag checked. Accordingly, the diagnostic data at the time when the misfire temporary abnormality was judged are retained by temporary storage in the frame. Furthermore, after a misfire temporary abnormality has been judged, any abnormality other than the misfire and which stems from the misfire is detected as an abnormality by the abnormality detection program, but a final abnormality flag is set at a corresponding predetermined bit in the standby RAM. Therefore, a corresponding abnormal code is not set at the top address of the diagnostic data storage area. Accordingly, erroneous storage of diagnostic data are frozen (inhibited). In this state, if a misfire final abnormality is judged, an abnormal code is set, and diagnostic data at the time when the misfire was first detected and the misfire temporary abnormality was judged are stored finally.

Figure 9:
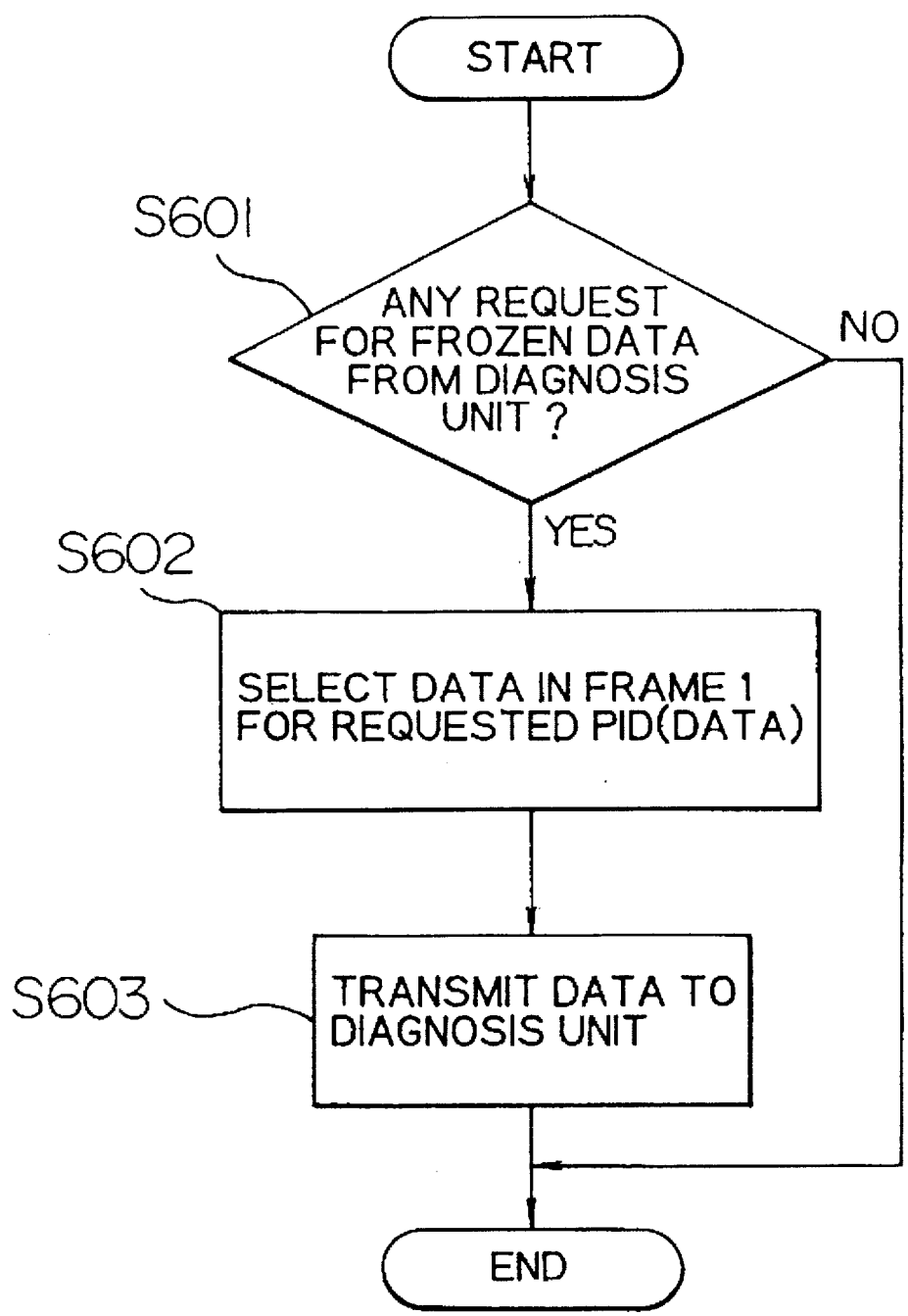
FIG. 9 is a flow chart illustrating a program for transmitting diagnostic data to a failure diagnosis unit starting at every 10 ms.

FIG. 9 is a flow chart illustrating a program for transmitting diagnostic data to a failure diagnosis unit which is connected after a vehicle has stopped. This program is restarted every 16 ms. It is checked at Step S601 whether a request for frozen diagnostic data has been made by the failure diagnosis unit. If the request has been made, the diagnostic data in the frame corresponding to the requested PID (data) are selected at Step S602. The selected diagnostic data are transmitted to the failure diagnosis unit at Step S603. Here, the requested PID (data) are diagnostic data whose transmission in the form of an ID is requested by the failure diagnosis unit. For example, PID1 represents an engine speed, and PID2 represents a vehicle speed.

Next, a second embodiment of the present invention will be described. In the first embodiment, an explanation was made only with respect to the detection of a misfire which is judged to be a final abnormality after detection during each of two trips. The second embodiment relates to a case where plural kinds of abnormalities are judged during two trips, and the processes executed in this case are illustrated by the flow chart shown in FIG. 10.

Figure 10:
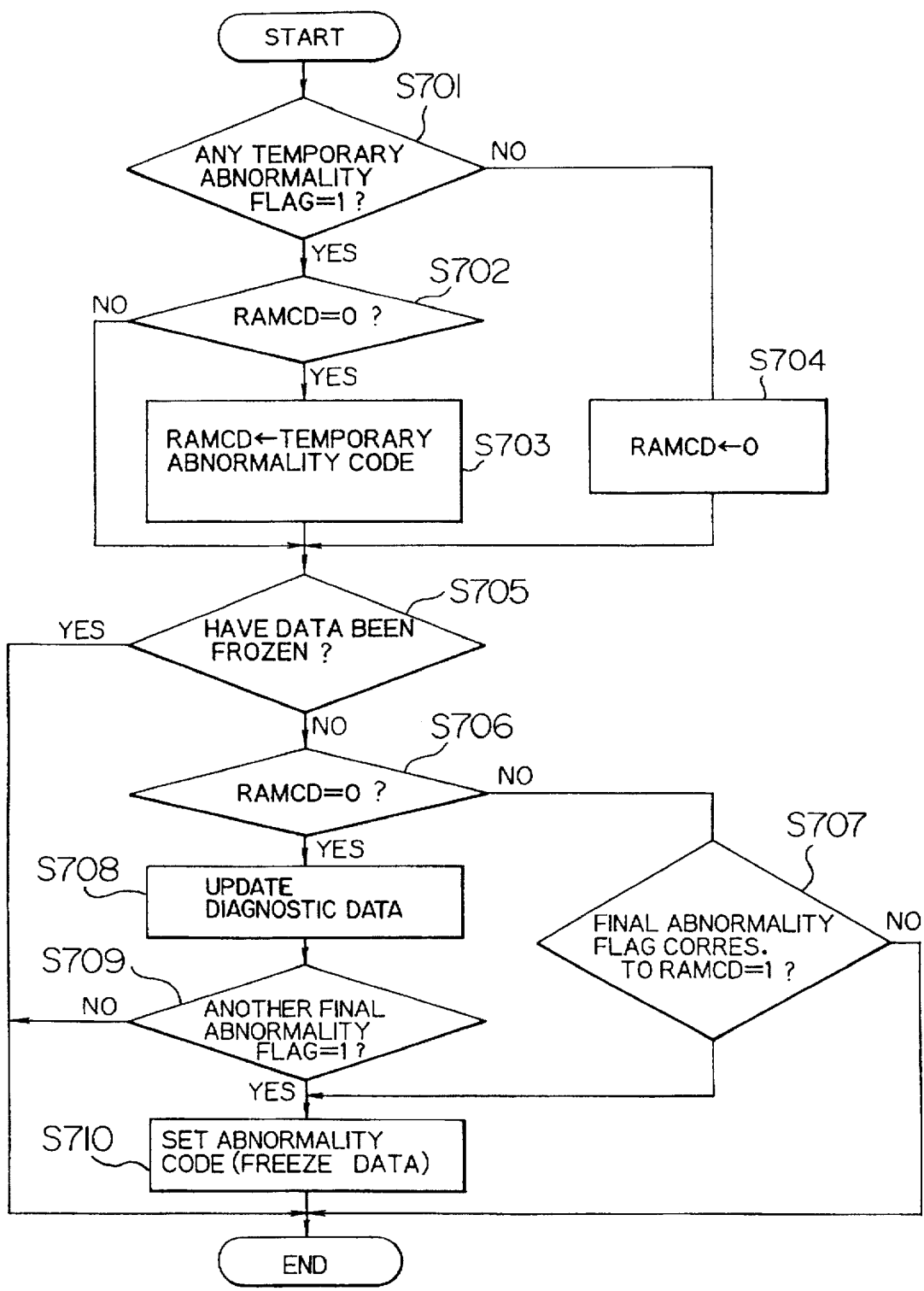
FIG. 10 is a flow chart illustrating an abnormality detection program for detecting plural kinds of abnormalities which are judged during two trips.
Figure 11:
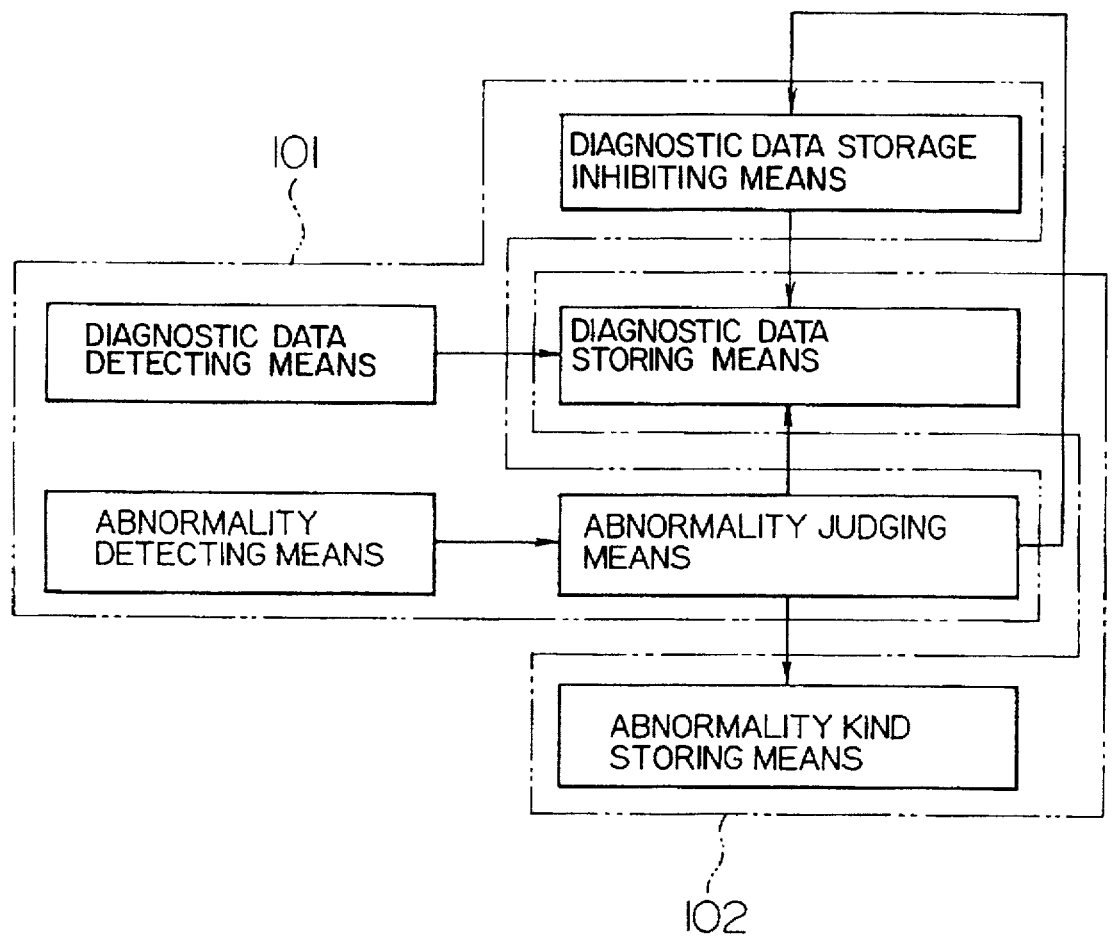
FIG. 11 is a functional block diagram of the self-diagnosis apparatus for vehicles according to the present invention.

Referring to FIG. 10, it is checked at Step S701 whether any temporary abnormality flag has been set. If set, it is checked at Step S702 whether a temporary abnormality code storage RAMCD is "0". If "0", a temporary abnormality code corresponding to the temporary abnormality flag is stored in RAMCD. If it is judged at Step S701 that no temporary abnormality flag has been set, RAMCD is cleared.

It is checked at Step S705 whether an abnormal code has been set in the frame and whether diagnostic data have been frozen (updating of diagnostic data has been inhibited). If not frozen, it is checked at Step S706 whether RAMCD is "0". If RAMCD is not "0", it is checked at Step S707 whether a final abnormality flag corresponding to the temporary abnormality code stored in RAMCD has been set. If set, the process proceeds to Step S710, and an abnormal code is set in the frame to freeze the diagnostic data at Step S710. If it is judged at step S707 that a final abnormality flag corresponding to the temporary abnormality code stored in RAMCD has not been set, the processes of this program come to an end.

If it is judged at Step S706 that RAMCD is "0", the diagnostic data are updated at Step S708. Then, it is checked at Step S709 whether any other final abnormality flag corresponding to an abnormality to be judged during another trip has been set. If set, an abnormality code for the above abnormality is immediately set in the frame to thereby freeze the diagnostic data.

Thus, with the above-mentioned processes, in the case where plural kinds of abnormalities are judged during two trips, when a first abnormality is detected during a first trip, a temporary abnormality code for this abnormality is stored in RAMCD, and thereafter updating of data is inhibited. If an abnormality corresponding to the temporary abnormality code is detected again during a second trip, the abnormality is judged to be a final abnormality, and the diagnostic data are frozen. Furthermore, if an abnormality corresponding to a temporary abnormality code is not detected and the operating state is judged to be normal during a second trip, even by the abnormality detection program (similar to the misfire abnormality detection program of the first embodiment shown in FIG. 3 in which a final abnormality is judged when abnormalities are judged during two consecutive trips), a temporary abnormality flag is reset by this abnormality detection program, so that a temporary abnormality code in RAMCD is erased.

Further, another concrete example, in which plural kinds of abnormalities are judged during two trips, will be explained hereunder. In this exemplary case, a first abnormality is an abnormality occurring in an ignition system and a second abnormality is an abnormality occurring in a fuel supply system. In this case, a misfire temporary abnormality is set when a misfire is detected during a first trip. Then, if another misfire is not detected during a second trip, but instead a fuel supply abnormality is detected during the second trip, the fuel supply system is judged to be in a state of a final abnormality, and RAMCD is set. However, as to data freezing for the analysis of the misfire which occurred initially, only a misfire temporary abnormality is set, but no data freezing is performed, even if the abnormality in the fuel supply system is detected during the second trip, unless a further misfire is detected during the second trip.

As described above, the same advantages as those of the first embodiment can be obtained by the above-described processes, even if plural types of abnormalities are detected and judged during two trips.

In the above embodiments, although abnormalities judged during two trips have been described byway of example, the use of a temporary abnormality flag may be applied to a case of judging an abnormality during three or more trips, thereby obtaining similar advantages as described above.

Furthermore, in the self-diagnosis apparatus of the present invention, it may be possible that not only frozen diagnostic data but also temporarily stored diagnostic data can be read out.

As appreciated from the foregoing description of the present invention, it is possible to store more accurate and more pertinent diagnostic data for an abnormality occurring and to be judged during several trips without being washed over by the storage of diagnostic data related to an abnormality having a high emergency. In this way, more accurate and pertinent diagnostic data which is not affected by another abnormality which stems from the original abnormality can be stored and analyzed.

What is claimed is:

1. A self-diagnosis apparatus for a vehicle comprising:
   abnormality detecting means for detecting whether or not a first abnormality occurs in a first device mounted on said vehicle and whether or not a second abnormality occurs in a second device mounted on said vehicle;
   diagnostic data detecting means for detecting diagnostic data necessary for analyzing said first abnormality and said second abnormality;
   abnormality judging means for judging said first abnormality to be a temporary first abnormality when the occurrence of said first abnormality in said first device is first detected, for judging said temporary first abnormality to be a final first abnormality when the occurrence of said first abnormality in said first device has been detected a first predetermined number of times after said judgement of said temporary first abnormality, for judging said second abnormality to be a temporary second abnormality when the occurrence of said second abnormality in said second device is first detected, and for judging said temporary second abnormality to be a final second abnormality when the occurrence of said second abnormality in said second device has been detected a second predetermined number of times after said judgement of said temporary second abnormality, said second predetermined number of times being fewer than said first predetermined number of times, wherein said abnormality detecting means continues to detect for said first and second abnormalities during operation of said abnormality judging means;

diagnostic data storage means for temporarily storing diagnostic data detected by said diagnostic data detecting means when said judgement of said temporary first abnormality is made, for finally storing said temporarily stored diagnostic data when said judgement of said final first abnormality is made, for temporarily storing diagnostic data detected by said diagnostic data detecting means when said judgement of said temporary second abnormality is made, and for finally storing said temporarily stored diagnostic data when said judgement of said final second abnormality is made; and diagnostic data storage inhibiting means, for controlling said diagnostic data storage means and functioning from a time when the occurrence of any one of said first abnormality and second abnormality has first been detected, by inhibiting, until said judgement of a final first abnormality is made after said judgement of a temporary first abnormality, final storage of temporarily stored diagnostic data from being made when said judgement of a final second abnormality is made even after the judgement of a temporary second abnormality was made, said diagnostic data storage means finally storing said temporarily stored diagnostic data of said first abnormality after said inhibiting.

2. A self-diagnosis apparatus for a vehicle according to claim 1, further comprising:
   temporary abnormality storage means for storing a temporary abnormality code corresponding to said first abnormality judged to be a temporary first abnormality;
   said abnormality judging means judging said final first abnormality in accordance with said temporary abnormality code stored in said temporary abnormality storage means;
   said first abnormality and said second abnormality each being deemed to be detected only once during a single trip of said vehicle, said single trip corresponding to a vehicle operation between a time when an ignition switch of said vehicle is turned on and a time when said ignition switch is turned off.

3. A self-diagnosis apparatus for a vehicle according to claim 1, wherein:
   said first device and said second device each include a device selected from a group consisting of an engine ignition system device and a fuel supply system device.

4. A self-diagnosis apparatus for a vehicle according to claim 1, wherein:
   said first abnormality and said second abnormality are each deemed to be detected only once during a single trip of said vehicle, said single trip corresponding to a vehicle operation between a time when an ignition switch of said vehicle is turned on to a time when said ignition switch is turned off.

5. A self-diagnosis apparatus for a vehicle according to claim 4, further comprising:

temporary abnormality storage means for storing a temporary abnormality code corresponding to said first abnormality judged to be a temporary first abnormality;

said abnormality judging means judging said final first abnormality in accordance with said temporary abnormality code stored in said temporary abnormality storage means.

6. A self-diagnosis apparatus for a vehicle according to claim 1, wherein:

said first device is an engine ignition system device; and said second device is a fuel supply system device.

7. A self-diagnosis apparatus for a vehicle according to claim 1, wherein:

said first device is an engine ignition system device; and said second device is a throttle sensor device.

8. A self-diagnosis apparatus for a vehicle according to claim 1, wherein:

said first abnormality includes an ignition system abnormality; and said second abnormality includes one of a fuel supply system abnormality and a throttle sensor abnormality.

9. A self-diagnosis apparatus for a vehicle having a first vehicle-mounted device and a second vehicle-mounted device, said self-diagnosis apparatus comprising:

operating condition detecting means for detecting an operating condition of said vehicle and for producing vehicle operating condition data;

control data output means for outputting control data for controlling said vehicle in accordance with said operating condition of said vehicle;

first storage means for storing at least one of said vehicle operating condition data and said control data as diagnostic data for analyzing an abnormality of said first vehicle-mounted device, said first storage means storing said data after said abnormality of said first vehicle-mounted device has been detected a first predetermined number of times;

second storage means for storing at least one of said vehicle operating condition data and said control data as diagnostic data for analyzing an abnormality of said second vehicle-mounted device, said second storage means storing said data after said abnormality of said second vehicle-mounted device has been detected a second predetermined number of times, said second predetermined number of times being fewer than said first predetermined number of times, and said abnormality of said second vehicle-mounted device having a higher degree of emergency than said abnormality of said first vehicle-mounted device; and inhibiting means for inhibiting said second storage means from storing said diagnostic data even after said abnormality of said second vehicle-mounted device has been detected at least said second predetermined number of times, if said abnormality of said first vehicle-mounted device has been detected fewer times than said first predetermined number of times.

10. A self-diagnosis apparatus for a vehicle according to claim 9, wherein:

said first predetermined number of times and said second predetermined number of times are each counted in accordance with a number of trips of said vehicle, each trip of said vehicle being a vehicle operation time period from a time when an ignition switch of said vehicle is turned on to a time when said ignition switch is turned off.

11. A self-diagnosis apparatus for a vehicle according to claim 9, wherein:

said first vehicle-mounted device and said second vehicle-mounted device each include a device selected from a group consisting of an engine ignition system device and a fuel supply system device.

12. A self-diagnosis apparatus for a vehicle according to claim 9, wherein:

said first vehicle-mounted device is an engine ignition system device; and said second vehicle-mounted device is a fuel supply system device.

13. A self-diagnosis apparatus for a vehicle according to claim 9, wherein:

said first vehicle-mounted device is an engine ignition system device; and said second vehicle-mounted device is a throttle sensor device.

14. A self-diagnosis apparatus for a vehicle according to claim 9, wherein:

said abnormality of said first vehicle-mounted device includes an ignition system abnormality; and said abnormality of said second vehicle-mounted device includes one of a fuel supply system abnormality and a throttle sensor abnormality.

15. A self-diagnosis method for a vehicle comprising the steps of:

detecting whether or not a first abnormality occurs in a first device mounted on said vehicle and diagnostic data necessary for analyzing said first abnormality;

judging said first abnormality to be a temporary first abnormality when the occurrence of said first abnormality in said first device is first detected, and temporarily storing said diagnostic data necessary for analyzing said first abnormality when said judgement of said temporary first abnormality is made;

judging said temporary first abnormality to be a final first abnormality when the occurrence of said first abnormality in said first device has been detected a first predetermined number of times after said judgement of said temporary first abnormality, and finally storing said temporarily stored diagnostic data necessary for analyzing said first abnormality when said judgement of said final first abnormality is made;

detecting whether or not a second abnormality occurs in a second device mounted on said vehicle and diagnostic data necessary for analyzing said second abnormality;

judging said second abnormality to be a temporary second abnormality when the occurrence of said second abnormality in said second device is first detected, and temporarily storing said diagnostic data necessary for analyzing said second abnormality when said judgement of said temporary second abnormality is made;

judging said temporary second abnormality to be a final second abnormality when the occurrence of said second abnormality in said second device has been detected a second predetermined number of times after said judgement of said temporary second abnormality, said second predetermined number of times being fewer than said first predetermined number of times, and finally storing said temporarily stored diagnostic data necessary for analyzing said second abnormality when said judgement of said final second abnormality is made, but after said judgement of said final first abnormality has been made when said judgement of said temporary first abnormality occurs before said judgement of said final second abnormality.

16. A self-diagnosis method for a vehicle having a first vehicle-mounted device and a second vehicle-mounted device, said self-diagnosis method comprising the steps of:

detecting an operating condition of said vehicle and producing vehicle operating condition data;

outputting control data for controlling said vehicle in accordance with said operating condition of said vehicle;

storing at least one of said vehicle operating condition data and said control data as diagnostic data for analyzing an abnormality of said first vehicle-mounted device, after said abnormality of said first vehicle-mounted device has been detected a first predetermined number of times;

storing at least one of said vehicle operating condition data and said control data as diagnostic data for analyzing an abnormality of said second vehicle-mounted device, after said abnormality of said second vehicle-mounted device has been detected a second predetermined number of times, said second predetermined number of times being fewer than said first predetermined number of times, and said abnormality of said second vehicle-mounted device having a higher degree of emergency than said abnormality of said first vehicle-mounted device; and inhibiting said storage of said diagnostic data even after said abnormality of said second vehicle-mounted device has been detected at least said second predetermined number of times, if said abnormality of said first vehicle-mounted device has been detected fewer times than said first predetermined number of times, said diagnostic data for analyzing said abnormality of said first vehicle-mounted device being stored after said inhibiting.

17. A self-diagnosis apparatus for a vehicle comprising:

abnormality detecting means for detecting whether or not a first abnormality occurs in a first device mounted on said vehicle and whether or not a second abnormality occurs in a second device mounted on said vehicle;

diagnostic data detecting means for detecting diagnostic data necessary for analyzing said first abnormality and said second abnormality;

abnormality judging means for judging said first abnormality to be a temporary first abnormality when the occurrence of said first abnormality in said first device is first detected, for judging said temporary first abnormality to be a final first abnormality when the occurrence of said first abnormality in said first device has been detected a first predetermined number of times after said judgement of said temporary first abnormality, for judging said second abnormality to be a temporary second abnormality when the occurrence of said second abnormality in said second device is first detected, and for judging said temporary second abnormality to be a final second abnormality when the occurrence of said second abnormality in said second device has been detected a second predetermined number of times after said judgement of said temporary second abnormality, said second predetermined number of times being fewer than said first predetermined number of times, wherein said abnormality detecting means continues to detect for said first and second abnormalities during operation of said abnormality judging means;

diagnostic data storage means for temporarily storing first diagnostic data detected by said diagnostic data detecting means when said judgement of said temporary first abnormality is made, for finally storing said temporarily stored first diagnostic data when said judgement of said final first abnormality is made, for temporarily storing second diagnostic data detected by said diagnostic data detecting means when said judgement of said temporary second abnormality is made, and for finally storing said temporarily stored second diagnostic data when said judgement of said final second abnormality is made; and diagnostic data storage inhibiting means coupled to said diagnostic data storage means, for inhibiting said final storage of said temporarily stored second diagnostic data if said first abnormality has been detected fewer times than said first predetermined number of times, said temporarily stored first diagnostic data being finally stored after said inhibiting.

18. A self-diagnosis method for a vehicle having a first vehicle-mounted device and a second vehicle-mounted device, said self-diagnosis method comprising the steps of:

detecting an operating condition of said vehicle and producing vehicle operating condition data;

outputting control data for controlling said vehicle in accordance with said operating condition of said vehicle;

storing at least one of said vehicle operating condition data and said control data as diagnostic data for analyzing an abnormality of said first vehicle-mounted device, after said abnormality of said first vehicle-mounted device has been detected a first predetermined number of times;

storing at least one of said vehicle operating condition data and said control data as diagnostic data for analyzing an abnormality of said second vehicle-mounted device, after said abnormality of said second vehicle-mounted device has been detected a second predetermined number of times, said second predetermined number of times being fewer than said first predetermined number of times, and said abnormality of said second vehicle-mounted device having a higher degree of emergency than said abnormality of said first vehicle-mounted device; and when said abnormality of said second vehicle-mounted device has been detected at least said second predetermined number of times, if said abnormality of said first vehicle-mounted device has been detected fewer times than said first predetermined number of times, inhibiting said storage of said diagnostic data for analyzing said abnormality of said second vehicle-mounted device, and permitting storage of said diagnostic data for analyzing said abnormality of said first vehicle-mounted device.

* * * * *